US009524155B2

(12) United States Patent
Kubo

(10) Patent No.: US 9,524,155 B2
(45) Date of Patent: Dec. 20, 2016

(54) INFORMATION PROCESSING APPARATUS, INFORMATION PROCESSING METHOD AND STORAGE MEDIUM

(75) Inventor: Takuya Kubo, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 604 days.

(21) Appl. No.: 13/584,024

(22) Filed: Aug. 13, 2012

(65) Prior Publication Data

US 2013/0050509 A1    Feb. 28, 2013

(30) Foreign Application Priority Data

Aug. 31, 2011  (JP) ................................. 2011-189401

(51) Int. Cl.
*G06F 15/16* (2006.01)
*G06F 9/445* (2006.01)

(52) U.S. Cl.
CPC .............. *G06F 8/61* (2013.01); *G06F 9/44526* (2013.01)

(58) Field of Classification Search
CPC ........... G04B 19/00; G04C 17/00; G04G 9/00; G06F 3/00; H04L 43/04
USPC ....................................... 348/207.1; 709/221
See application file for complete search history.

(56) References Cited

U.S. PATENT DOCUMENTS

| 8,732,216 | B2* | 5/2014 | Guo et al. ...................... 707/821 |
| 2007/0127773 | A1* | 6/2007 | Ogawa ........................... 382/103 |
| 2007/0133882 | A1* | 6/2007 | Matsuno ........................ 382/209 |
| 2007/0271282 | A1* | 11/2007 | Boren ............................ 707/100 |
| 2008/0313549 | A1* | 12/2008 | Stoyanov et al. ............. 715/749 |
| 2010/0277508 | A1* | 11/2010 | Takahashi ...................... 345/660 |
| 2011/0093580 | A1* | 4/2011 | Nagasaka et al. ............. 709/223 |
| 2012/0250950 | A1* | 10/2012 | Papakipos et al. ........... 382/118 |

FOREIGN PATENT DOCUMENTS

| CN | 101005368 A | 7/2007 |
| CN | 101165647 A | 4/2008 |
| CN | 101876908 A | 11/2010 |
| CN | 102012826 A | 4/2011 |
| JP | 2001-061020 | 3/2001 |
| JP | 2003-015880 A | 1/2003 |
| JP | 2003-022189 A | 1/2003 |
| JP | 2006-011677 A | 1/2006 |
| JP | 2006-318286 A | 11/2006 |

OTHER PUBLICATIONS

Japanese Office Action without an English Translation, that issued in Japanese Patent Application No. 2011-189401.
A Jul. 13, 2015 Chinese Office Action with an English Translation, that issued in Chinese Patent Application No. 201210309901.
Nov. 4, 2014 Chinese Office Action, with an English Translation, that issued in Chinese Patent Application No. 201210309901.X.

* cited by examiner

*Primary Examiner* — Douglas Blair
(74) *Attorney, Agent, or Firm* — Cowan, Liebowitz & Latman, P.C.

(57) ABSTRACT

An information processing apparatus arranged to add on a function in accordance with a file to be actually edited among files held by a user to allow the user to select a function to be added to an image processing application in accordance with image information of a selected image, determines a feature of an image selected from a recording medium, searches for and decides a function to be added to the application on the basis of the determined feature, and installs a program corresponding to the decided function in the information processing apparatus from outside.

9 Claims, 17 Drawing Sheets

FIG. 2
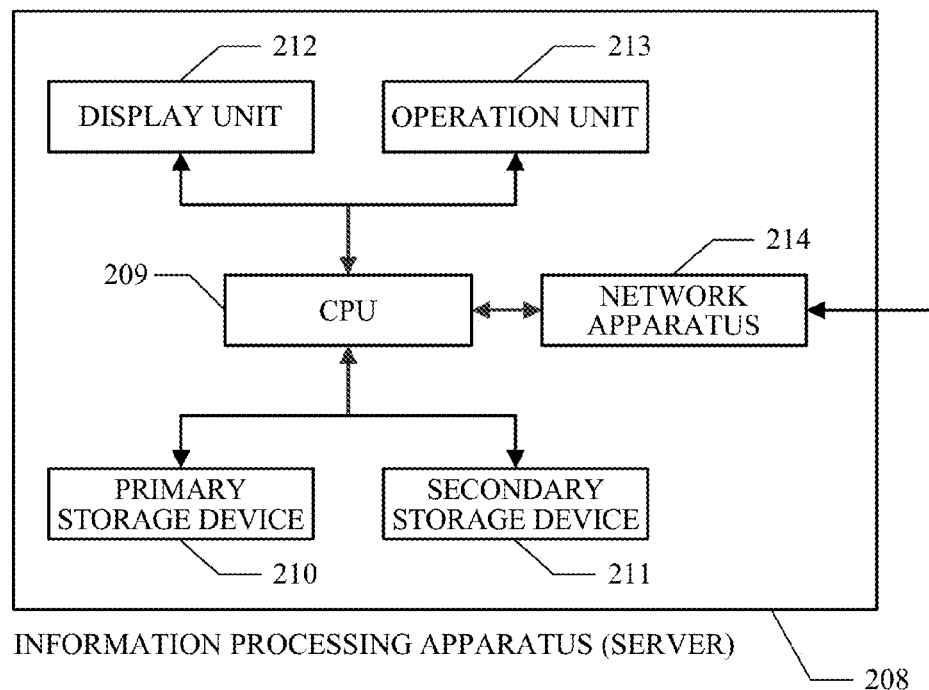
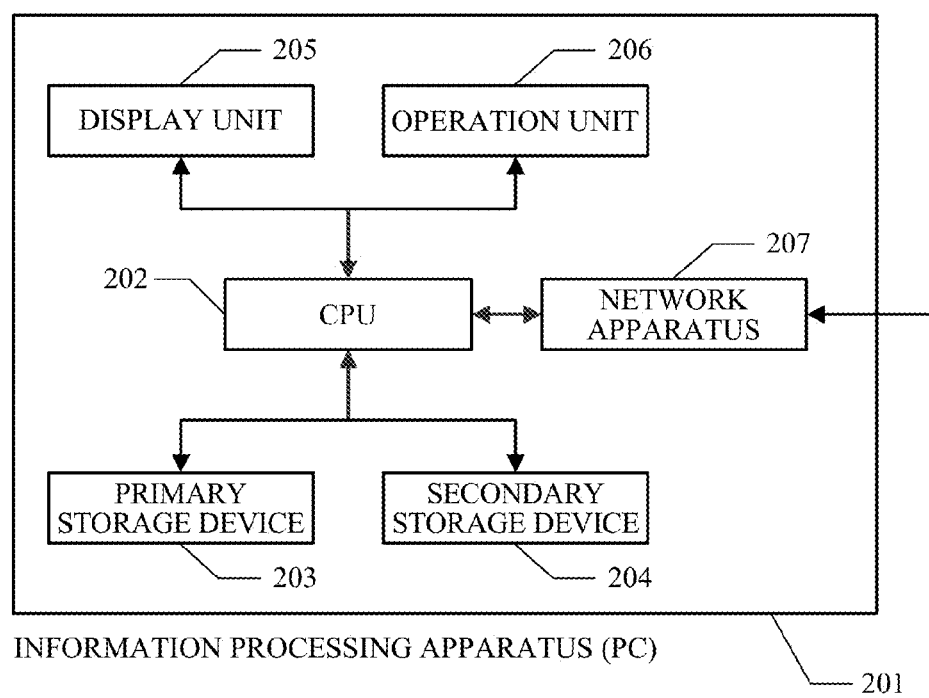

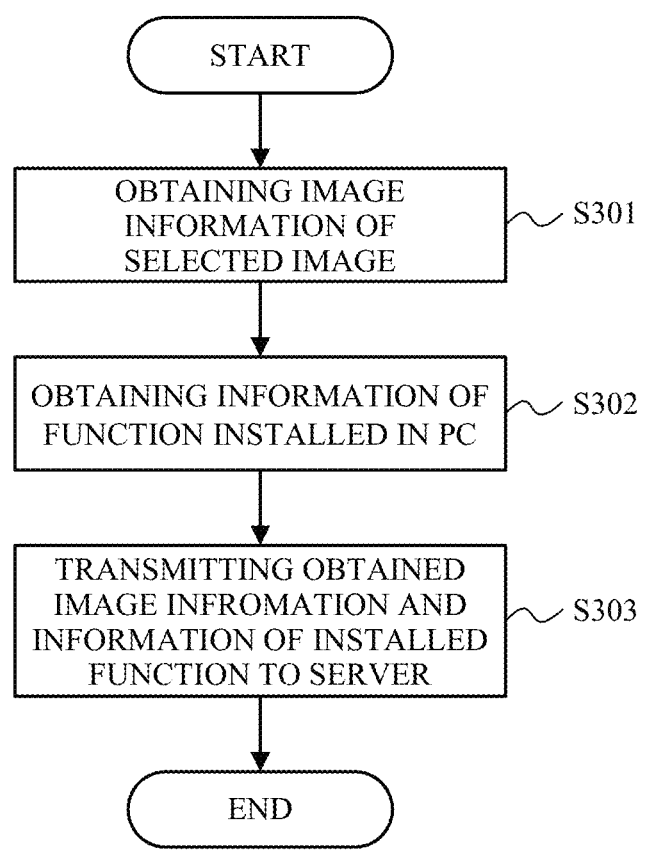

FIG. 4A

| IMAGE INFORMATION OF SELECTED IMAGE | | | |
|---|---|---|---|
| ID | TYPE | ID | VALUE |
| 001 | IMAGE FORMAT | 001 | JPG |
| 002 | PHOTOGRAPHING MODE | 008 | UNDERWATER |
| 003 | GPS INFORMATION | 001 | YES |

| FUNCTION INSTALLED | |
|---|---|
| ID | FUNCTION NAME |
| 001 | AUTO ADJUSTMENT |
| 008 | MOVING IMAGE CUT |
| 009 | RAW DEVELOPMENT |

FUNCTION INFORMATION MANAGEMENT TABLE

IMAGE INFORMATION — 601

| ID | TYPE | ID | VALUE |
|---|---|---|---|
| 001 | IMAGE FORMAT | 001 | JPG |
| | | 002 | MOVING IMAGE |
| | | 003 | RAW |
| 002 | PHOTOGRAPHING MODE | 008 | UNDERWATER |
| | | 011 | NIGHT |
| | | 015 | SPORTS |
| 003 | GPS INFORMATION | 001 | YES |
| 004 | AEB PHOTOGRAPHING | 001 | YES |
| 005 | ISO SENSITIVITY | 001 | OVER 800 |
| 006 | STROBO | 001 | ON |

FUNCTION INFORMATION — 602

| ID | FUNCTION NAME | DISPLAY PRIORITY |
|---|---|---|
| 001 | AUTO ADJUSTMENT | 1 |
| 002 | BRIGHTNESS CORRECTION | 11 |
| 003 | TRIMMING (JPG) | 21 |
| 004 | CONTRAST ADJUSTMENT | 31 |
| 005 | TILT CORRECTION | 41 |
| 006 | STILL IMAGE CUT-OUT | 2 |
| 007 | MOVING IMAGE COMBINE | 12 |
| 008 | MOVING IMAGE CUT | 22 |
| 009 | RAW DEVELOPMENT | 3 |
| 010 | TRIMMING (RAW) | 13 |
| 011 | UNDERWATER CORRECTION | 4 |
| 012 | NIGHT SCENE CORRECTION | 5 |
| 013 | VIBRATION CORRECTION | 6 |
| 014 | MAP DISPLAY | 7 |
| 015 | IMAGE SYNTHESIZATION (HDR) | 8 |
| 016 | NOISE ELIMINATION | 9 |
| 017 | RED-EYE CORRECTION | 10 |

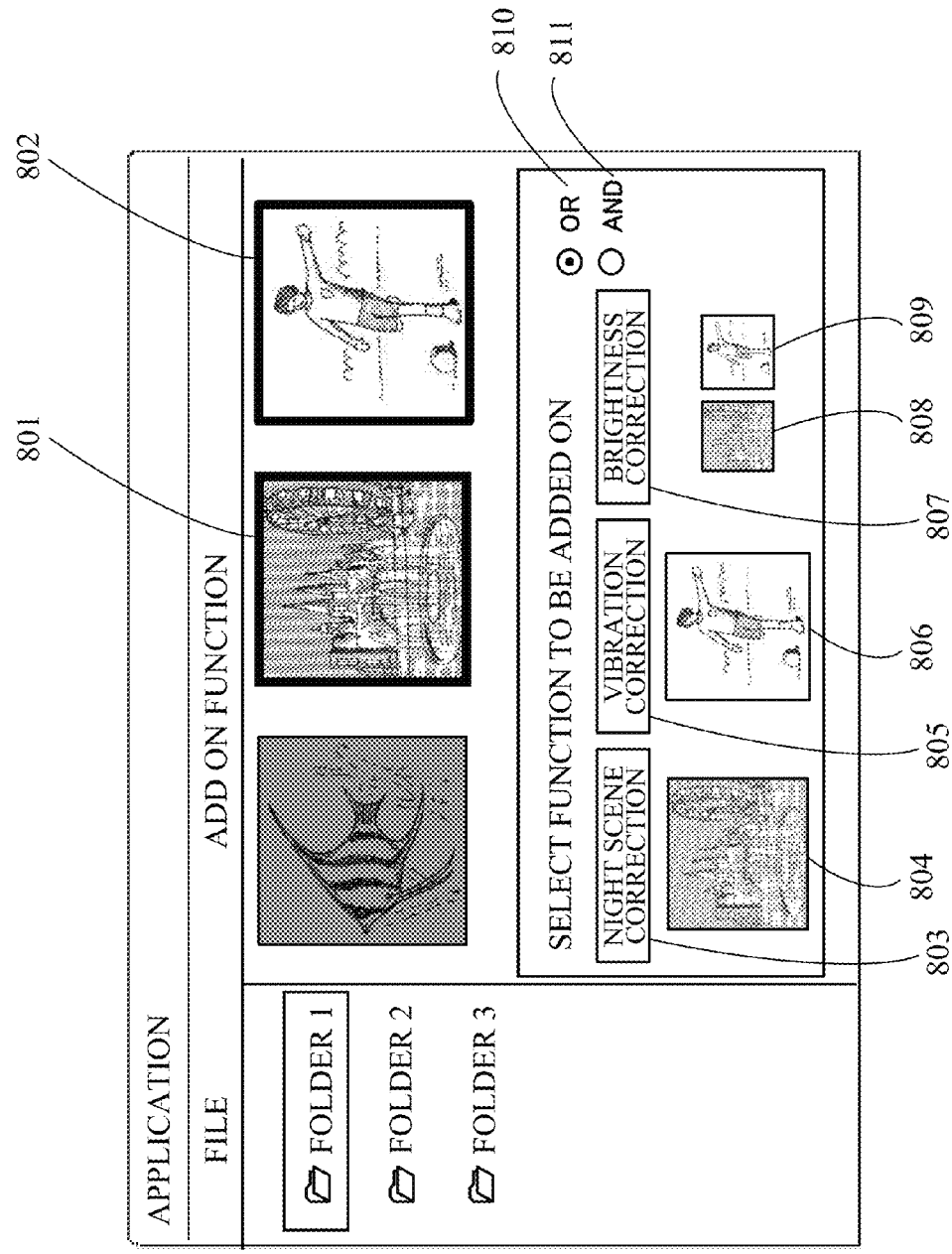

FIG. 9C

| ID | IMAGE INFORMATION | | | FUNCTION INFORMATION | | |
|---|---|---|---|---|---|---|
| | TYPE | ID | VALUE | ID | FUNCTION NAME | DISPLAY PRIORITY |
| 001 | IMAGE FORMAT | 001 | JPG | 001 | AUTO ADJUSTMENT | 1 |
| | | | | 002 | BRIGHTNESS CORRECTION | 11 |
| | | | | 003 | TRIMMING (JPG) | 21 |
| | | | | 004 | CONTRAST ADJUSTMENT | 31 |
| | | | | 005 | TILT CORRECTION | 41 |
| | | 002 | MOVING IMAGE | 006 | STILL IMAGE CUT-OUT | 2 |
| | | | | 007 | MOVING IMAGE COMBINE | 12 |
| | | | | 008 | MOVING IMAGE CUT | 22 |
| | | 003 | RAW | 009 | RAW DEVELOPMENT | 3 |
| | | | | 010 | TRIMMING (RAW) | 13 |
| 002 | PHOTOGRAPHING MODE | 008 | UNDERWATER | 011 | UNDERWATER CORRECTION | 4 |
| | | 011 | NIGHT | 012 | NIGHT SCENE CORRECTION | 5 |
| | | 015 | SPORTS | 013 | VIBRATION CORRECTION | 6 |
| 003 | GPS INFORMATION | 001 | YES | 014 | MAP DISPLAY | 7 |
| 004 | AEB PHOTOGRAPHING | 001 | YES | 015 | IMAGE SYNTHESIZATION (HDR) | 8 |
| 005 | ISO SENSITIVITY | 001 | OVER 800 | 016 | NOISE ELIMINATION | 9 |
| 006 | STROBO | 001 | ON | 017 | RED-EYE CORRECTION | 10 |

FIG. 11A

| | RATIO OF IMAGE INFORMATION TO SELECTED 100 IMAGES | | |
|---|---|---|---|
| | TYPE | VALUE | RATIO |
| 1101 | IMAGE FORMAT | JPG | 85% |
| | | MOVING IMAGE | 15% |
| 1102 | | RAW | 5% |
| | PHOTOGRAPHING MODE | UNDERWATER | 0% |
| | | NIGHT SCENE | 10% |
| 1103 | | SPORTS | 90% |
| | GPS INFORMATION | YES | 60% |
| | | NO | 40% |

| IMAGE INFORMATION | | | | FUNCTION INFORMATION | | |
|---|---|---|---|---|---|---|
| ID | TYPE | ID | VALUE | ID | FUNCTION NAME | DISPLAY PRIORITY |
| 001 | IMAGE FORMAT | 001 | JPG | 001 | AUTO ADJUSTMENT | 1 |
| | | | | 002 | BRIGHTNESS CORRECTION | 11 |
| | | | | 003 | TRIMMING (JPG) | 21 |
| | | | | 004 | CONTRAST ADJUSTMENT | 31 |
| | | | | 005 | TILT CORRECTION | 41 |
| | | 002 | MOVING IMAGE | 006 | STILL IMAGE CUT-OUT | 2 |
| | | | | 007 | MOVING IMAGE COMBINE | 12 |
| | | | | 008 | MOVING IMAGE CUT | 22 |
| | | 003 | RAW | 009 | RAW DEVELOPMENT | 3 |
| | | | | 010 | TRIMMING (RAW) | 13 |
| 002 | PHOTOGRAPHING MODE | 008 | UNDERWATER | 011 | UNDERWATER CORRECTION | 4 |
| | | 011 | NIGHT | 012 | NIGHT SCENE CORRECTION | 5 |
| | | 015 | SPORTS | 013 | VIBRATION CORRECTION | 6 |
| 003 | GPS INFORMATION | 001 | YES | 014 | MAP DISPLAY | 7 |
| 004 | AEB PHOTOGRAPHING | 001 | YES | 015 | IMAGE SYNTHESIZATION (HDR) | 8 |
| 005 | ISO SENSITIVITY | 001 | OVER 800 | 016 | NOISE ELIMINATION | 9 |
| 006 | STROBO | 001 | ON | 017 | RED-EYE CORRECTION | 10 |

1106, 1109, 1107, 1108

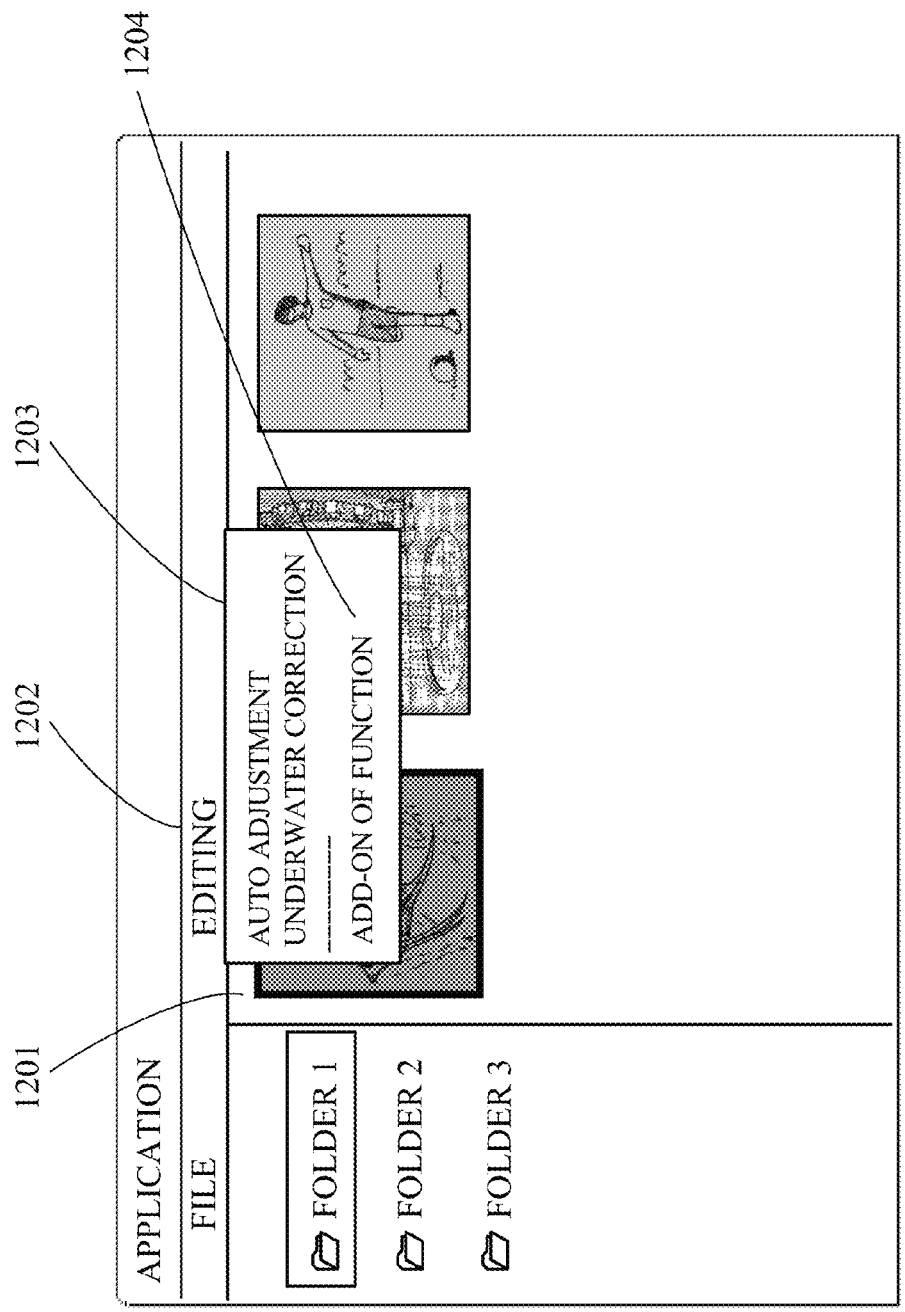

INFORMATION PROCESSING APPARATUS, INFORMATION PROCESSING METHOD AND STORAGE MEDIUM

BACKGROUND OF THE INVENTION

Field of the Invention

The present invention relates to an information processing apparatus, in particular, an information processing apparatus arranged to add a function to an application program which processes an image, an information processing method, and a storage medium.

Related Background Art

Some application programs (hereinafter, denoted as applications) operating in a processing apparatus, for example, a personal computer (PC) can have a function which is not available from the current applications, added on as an expansion function. Such an expansion function is more frequently called a plug-in and enables a user to add on a function when necessary even after the user installs an application.

A method of a desired function being selected and added by a user from a list of functions published on a server is available as a method of adding on such a function.

Japanese Laid-Open Patent Application No. 2001-61020 discloses a method of causing the user to select an application by displaying applications that can be added on, in accordance with the type of incorporated data when the data is incorporated by a terminal.

However, when a function is to be selected from functions displayed as a list and added on, the user may be at a loss for selecting the function if many expansion functions are simply presented. Even if the user selects and adds on a function properly, the function may not be applicable to a user's installed file. To avoid such a case, a processing apparatus arranged to select an add-on function in accordance with a file which the user wishes to process (edit, for example) and, as a result, to add on only functions wished by the user to use is strongly desired.

SUMMARY OF THE INVENTION

The aspect of the invention is to solve all or at least one of the above-described problems.

Further, according to an aspect of the invention, an information processing apparatus arranged to communicate with a client in which an application program having an image processing function operates comprises a feature obtaining unit that obtains a feature of a subject image to be processed by the application program, a function selection unit that selects a function to be added to the application program on the basis of the feature obtained by the feature obtaining unit, and a program transmitting unit that obtains the installation program corresponding to the function selected by the function selection unit and transmits the obtained installation program to the client.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram showing a system configuration of an information processing apparatus according to an embodiment of the present invention.

FIG. 3 is a diagram showing a flowchart to obtain image information according to an embodiment of the present invention and to obtain information about functions installed in the image processing application.

FIGS. 4A and 4B are diagrams showing the configuration of image information according to an embodiment of the present invention and information about functions installed.

FIG. 6 is a diagram showing correspondences between image information and function information according to an embodiment of the present invention.

FIG. 8 is a diagram showing a function information display screen of the image processing application when a plurality of images is selected in an embodiment of the present invention.

FIGS. 9A, 9B, and 9C are diagrams showing image information of a plurality of images selected in an embodiment of the present invention and correspondences between the image information and function information.

FIGS. 11A and 11B are diagrams showing ratios of selected images having image information to selected images when many images are selected in an embodiment of the present invention and correspondences between the image information and function information.

FIGS. 12A and 12B are diagrams showing function information display screens displayed when an editing function is executed by the image processing application according to an embodiment of the present invention.

DESCRIPTION OF THE EMBODIMENTS

Figure 1A:
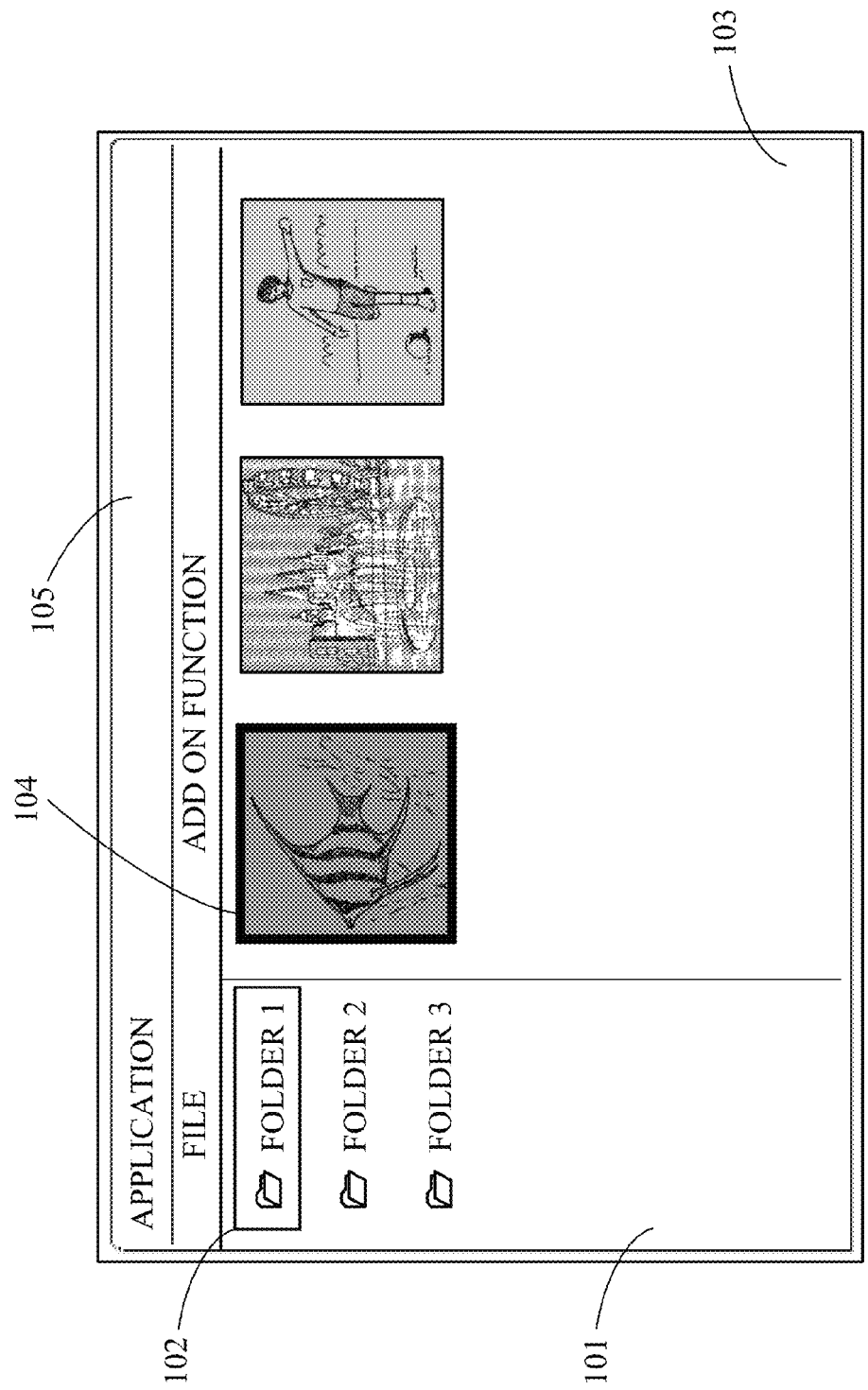
FIGS. 1A and 1B are diagrams showing display screens of an image processing application according to an embodiment of the present invention.

Various exemplary embodiments, features, and aspects of the invention will be described in detail below with reference to the drawings.

FIG. 2 is a diagram showing a system configuration of the present invention. Reference numeral 201 in FIG. 2 denotes an information processing apparatus (hereinafter, denoted as the PC) in which an application program (hereinafter, denoted as the application) having an image processing function is installed. Reference numeral 208 denotes an information processing apparatus (hereinafter, denoted as the server) to be an external apparatus of the PC 201 and has a function to provide an image processing application or an installation program for an add-on function to the user. According to the present invention, if the user executes the add-on function of the image processing application operating in the PC 201 under a condition that the user already selects the image, add-on functions (for example, functions that can be added on or a function of a recommended candidate to be added on) are searched for by using image information of the selected image. Then, by displaying information about searched functions by the image processing application, add-on functions correspondingly to the selected image are presented to the user. Reference numeral 202 denotes a CPU to control the whole PC 201. Reference numeral 204 denotes a secondary storage device such as a hard disk and stores a program to control an operation of the PC 201 by the CPU 202 and data such as an image file. Reference numeral 203 denotes a primary storage device such as a RAM, which stores a program read out from the secondary storage device and also provides a work area for executing a program. Reference numeral 205 denotes a display unit such as a liquid crystal display. Reference numeral 206 denotes an operation unit such as a keyboard and mouse. Reference numeral 207 denotes a network apparatus such as an Ethernet (registered trademark) terminal as a means for communicating with other computers. Reference numeral 208 denotes, as described above, a server. Reference numeral 209 denotes a CPU to control the whole server 208. Reference numeral 211 denotes a secondary storage device such as a hard disk, which stores a program to control the server 208 by the CPU 209. Also, Information about functions that is addable on to the image processing application in accordance with the embodiment of the present invention is stored.

The system in FIG. 2 is a basic configuration to achieve the configurations of embodiments of the present invention described below and a concrete configuration of each embodiment is realized by control operations of the CPUs according to the control programs stored in the respective secondary storage devices of the CPU 201 and the server 208.

First Embodiment

FIG. 1A shows a display screen of an image processing application operating in the PC 201 according to the present embodiment. Reference numeral 101 is a folder selection area. If a folder displayed in this area is selected, thumbnails of images stored in the selected folder are displayed in a thumbnail display area 103. Images are stored in a folder in a file format together with photographing information and attribute information and the folder is stored in a secondary storage device. In the case of FIG. 1A, a folder 102 is selected and three images are displayed in the thumbnail display area 103. An image displayed in the thumbnail display area 103 can be selected as an image processing subjected to by operating, for example, the operation unit 206 and in the case of FIG. 1A, a thumbnail image 104 is selected as an image processing subject. If an image is selected, a frame of the selected image is, as shown in FIG. 1A, highlighted. Naturally, other display methods may also be applied to indicate the selection.

If an image displayed in the thumbnail display area 103 is selected, add-on function processing 105 displayed in the menu can be selected to be performed. The add-on function processing may also be performed from the context menu or a dedicated button.

The flowchart in FIG. 3 shows processing performed by the PC 201 when add-on function processing is performed after image selection processing is performed. The processing is realized by each component of the PC 201 being controlled according to the program stored in the secondary storage device 204 by the CPU 202 to execute the image processing application.

In step S301, the CPU 202 first performs feature obtaining processing to obtain a feature of the selected image. The feature of the selected image includes, for example, date/time information of a date/time when the image is photographed and photographing information such as the aperture value and photographing mode. However, the feature of the selected image is not limited to the above information and may be, for example, feature amount data representing a result of analyzing of attribute information of the image, brightness and color tone of the image, and the type of an object by the CPU 202.

In the description that follows, information showing the feature of the image such as the above photographing information and feature amount data will in general be called image information.

An example of the image information of the image 104 selected by the image processing application in FIG. 1A is shown in FIG. 4A. As shown in FIG. 4A, the image information includes the type and value of the image information and the ID corresponding to each of the type and value. For example, image information 402 shows that the photographing mode is underwater. The ID of "002" is assigned to the type "photographing mode" of the image information and the ID of "008" is assigned to the value "underwater" of the image information. In processing inside a program or communication with a server, instead of transmitting/receiving information of "photographing mode" and "underwater", the ID "002" as the type of the image information and the ID "008" as the value of the image information are transmitted/received. By using IDs in this manner, the amount of handled information can be reduced. Moreover, when the image processing application is localized into many languages, communication with the server can be performed without being affected by the language.

According to FIG. 4A, the image information of the image 104 shows that the image format is JPG (401), the photographing mode is underwater (402), and GPS information is available (403). When obtaining image information in step S301, the image information may be read directly from image data or may be read from a database managed by the image processing application. The image information also includes thumbnail images. The thumbnail image is a reduced image which generally is of a resolution of 120 pixels in vertical and 160 pixels in horizontal.

In step S302, the CPU 202 obtains information about functions installed in the PC 201 as functions of the image processing application. The image processing application stores information about functions installed in the application in a registry or the like and thus can obtain information about functions installed by referring to information stored in the registry. FIG. 4B shows an example of obtained function information. The function information includes the ID and function name. The ID has a unique value that does not overlap with values of other functions and the developer of the image processing application is assumed to assigned a unique value to each function. FIG. 4B shows that functions of the automatic adjustment (404), moving image cut (405), and RAW development (406) are installed in the PC 201.

In step S303, the CPU 202 transmits the image information and function information obtained in step S302 to the server. The information is transmitted to the server 208 via the network apparatus 207. If, as described above, image itself is used as image information, the image or a reduced image thereof is transmitted as the image information, in addition to the image information in FIG. 4A.

Thus, in the present embodiment, information about functions installed in the PC is obtained in step S302 and the function information is transmitted to the server in step S303. This is because only add-on functions that are not installed in the PC are to be presented to the user when functions are added on. Thus, information about already-installed function is transmitted to the server, and then even if such an already-installed function is found when the function corresponding to the image information is searched for in the server, the function information thereof is not transmitted to the PC. Moreover, the function information transmitted from the PC 201 may be used by the server 208 to check the update state of the functions installed already.

Figure 5:
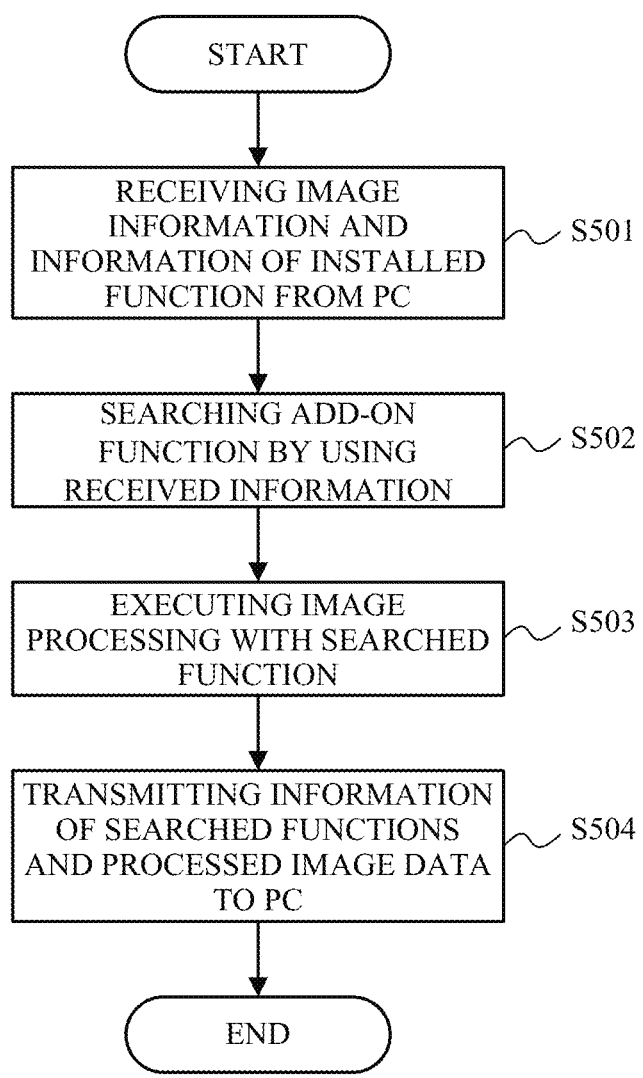
FIG. 5 is a diagram showing a flowchart of processing to decide an add-on function according to an embodiment of the present invention.

The flowchart in FIG. 5 shows processing in which the server 208 searches for a function to be recommended to the PC 201 to add on and selectively notifies the PC 201 of the add-on function by using the image information and function information transmitted by the PC 201 in step S303.

In step S501, the CPU 209 receives the image information and function information transmitted by the PC 201. The information transmitted by the PC 201 is received via a network apparatus 214.

In step S502, the CPU 209 generates function information to be transmitted to the PC 201 by using the received image information and function information. The function information is generated by searching for and deciding a function that is addable on to the PC 201 from management information stored in the secondary storage device 211 as a function information management table shown in FIG. 6 by using the received image information and function information.

As shown in FIG. 6, the function information management table may be divided into two, image information 601 and function information 602. The image information 601 includes all image information that may be transmitted from the PC. The configuration of the image information 601 is the same as the configuration of the image information described with reference to FIG. 4. The image information 401 showing that the image format is JPG in FIG. 4A is also present as reference numeral 603 in FIG. 6. Similarly, the image information 402 and the image information 403 in FIG. 4A are present as denoted by the reference numeral 604 and reference numeral 605 in FIG. 6. The function information 602 contains a function to be searched for. Such a function is related to image information. For example, functions (the still image cut-out, moving image combine, and moving image cut) denoted with the reference numeral 606 are related to the image information that the image format is a moving image. With the image information 601 and the function information 602 being associated (correspondence) in this manner, the function corresponding to the image information transmitted from the PC can be searched for. Like the configuration of the image information described with reference to FIG. 4B, the configuration of the function information 602 includes the ID and function name. The function information 602 may also include display priority information of functions as described later.

The description returns to the searching for add-on functions in step S502. The CPU 209 searches the function information management table for functions related to the received image information. If, for example, the image information shown in FIG. 4A is transmitted, as indicated by thick lines in the function information management table in FIG. 6, function information 607, function information 608, and function information 609 related to the image information 401, 402, and 403 become search results. That is, the brightness correction, trimming (JPG), contrast adjustment, tilt correction, underwater correction, and map display are search results of functions. The functions searched here are reported to the PC 201 as candidate functions to be added on. By performing function selection processing to select functions desired to be installed, from the candidate functions, only selected functions or all functions can be selected as functions to be added on in the PC 201.

The reason why function information 610 (automatic adjustment) related to the image information 401 is excluded from the search result will be described. When, as described above, the user adds on a function, there is no need to newly present functions installed in the PC 201. Thus, information of the automatic adjustment as a function included in the function information received in step S501 is excluded from the search result in step S502. By narrowing down the search result to functions other than the functions installed in the PC in this manner, functions already installed in the PC are prevented from being presented to the user.

The server 208 may be configured to obtain the update state of the installed functions contained in the function information received from the PC 201. For example, the latest version information of the installed functions may be obtained to be transmitted to the PC 201 together with the search result of add-on functions. In this manner, even for the functions already installed in the image processing application, update information of the newest version can be presented together with add-on functions.

In step S503, the CPU 209 processes the image by using each function contained in the search result. The image processing described here is to execute functions of the brightness correction, underwater correction and the like by using a thumbnail image. The thumbnail image used for image processing is a thumbnail image included in image information received from the PC 201. If the search result in step S502 is the function information 607 to 609, the image processing is performed by a total of six functions shown in FIG. 6.

In step S504, the CPU 209 transmits the function information of the search result and the image data resulted in the process in step S503 to the PC 201. If, for example, the image information shown in FIG. 4A is transmitted, the function information 607 to 609 of the search result and six thumbnail images created in step S502 are transmitted to the PC 201. The functions transmitted by the transmission processing by the server 208 in this manner become candidates of functions to be added on by the PC 201.

When the function information is transmitted to the PC 201, not only the ID, for example, "002", but also the function name "brightness correction" is also transmitted. The function name is also transmitted in addition to the ID because the PC is caused to display the function of the ID that has not been present in the PC in the case of an add-on function and thus, the function name cannot not known from the ID. In the present embodiment, the function information to be transmitted to the PC 201 is caused to also include information of a display priority 611. The display priority is information indicating the priority order of displaying the function information received from the server 208 is displayed by the image processing application in the PC 201. The display priority is information which can be set and corrected by the server administrator and the display priority of each function is assumed to be a unique value that is not duplicated as that of other functions. The image processing application of the PC 201 is configured to display the function information in ascending order of number of display priority. By allowing setting the display priority freely, it can be attained to properly determine and change the function to be strongly recommended to the user. Further, as described above, the server 208 may be configured to transmit also the latest version information of functions installed in the PC 201 to the PC 201. In this manner, versions of functions installed in the PC 201 can be checked and it becomes possible to call user's attention to update of the function on the basis of the version check result.

Figure 7:
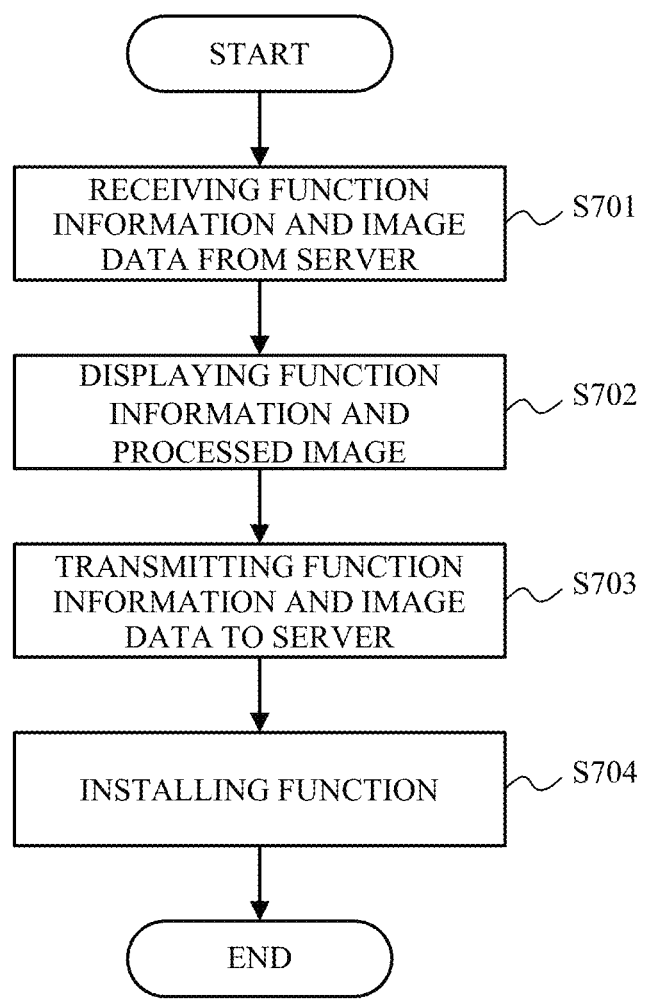
FIG. 7 is a diagram showing a flowchart of display processing of add-on function information according to an embodiment of the present invention.

The flowchart in FIG. 7 shows processing performed by the PC 201 when the PC 201 receives the function information and processed image data transmitted by the server 208.

In step S701, the CPU 202 receives function information and processed image data transmitted from the server 208.

Figure 1B:
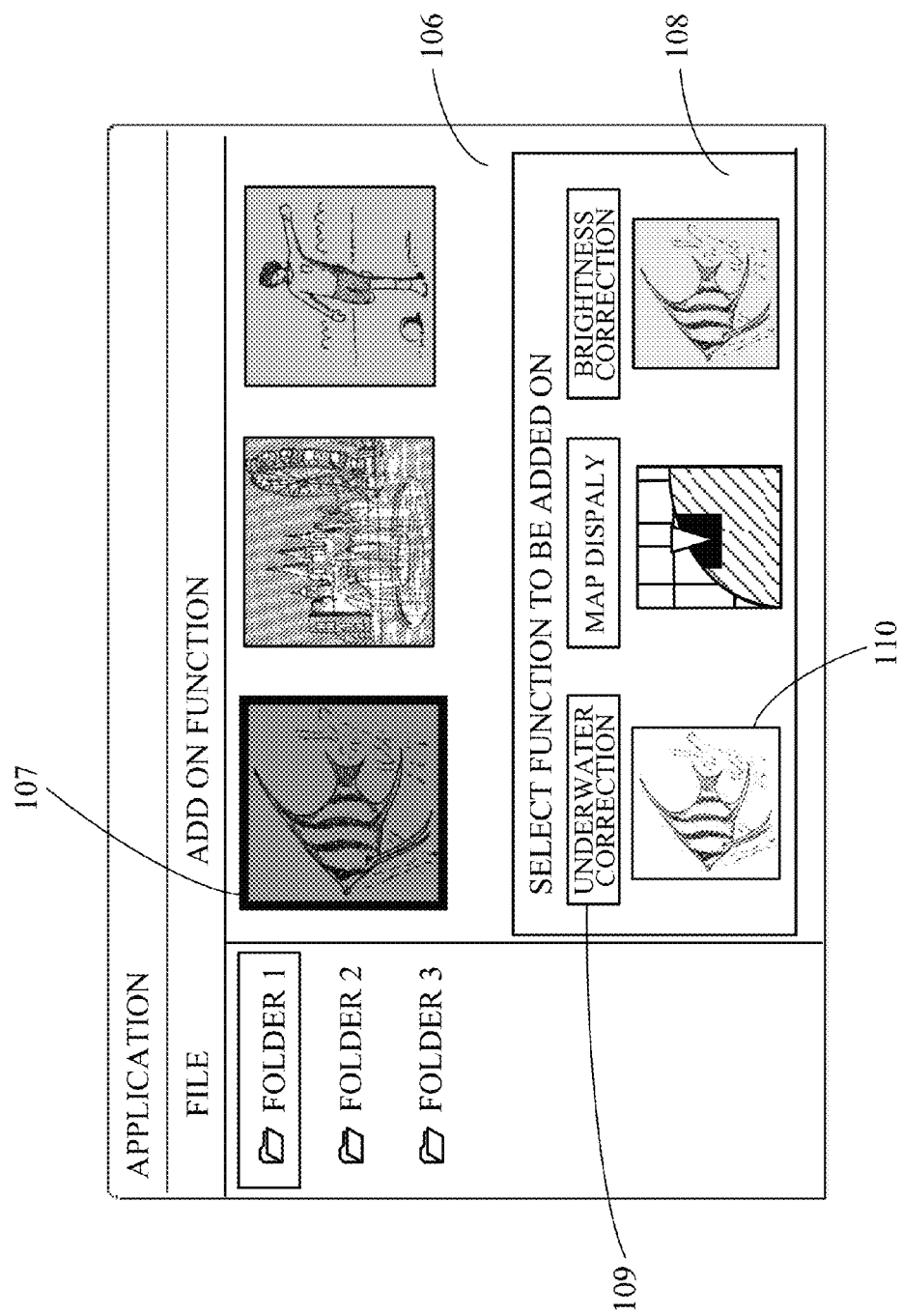

In step S702, the CPU 202 displays the received function information and processed image data by the image processing application. FIG. 1B shows a screen displaying the received function information and processed image data in the image processing application when the add-on function is executed under a condition that the image in FIG. 1A is already selected. That is, if the add-on function is executed in the state of FIG. 1A, the PC 201 communicates with the server and, as a result, the image processing application changes the display screen thereof to the state in FIG. 1B. Reference numeral 108 denotes a function information display area which displays received function information and processed image data. Reference numeral 109 denotes one piece of the function information received from the server 208. Reference numeral 110 denotes received and processed image data. By displaying, as shown above, the function information and processed image data as a set, the processed result of the selected image by the add-on function can be known at a glance and it becomes easier for the user to recognize functions that can be added on compared with a case when only the function name is displayed. When displaying the received function information in the function information display area 108, the CPU 202 controls the display according to the display priority included in the function information. In FIG. 1B, the function information is displayed from the left side of the screen in ascending order of number of received display priority. If all received function information cannot be included in the function information display area 108, a scroll bar may be provided in the function information display area 108 to be able to display all function information in order of display priority by moving the scroll bar. Alternatively, a button may be provided in the function information display area 108 so that another window is opened when the button is deppressed to display function information that cannot be contained in the function information display area 108 in the other window. In addition, a function to allow the user to select whether to display the function information on the basis of the display priority may be given to the image processing application. Further, if the latest version information of installed functions is received from the server 208, information indicating functions that can be updated among the installed functions may be displayed.

In FIG. 1B, if the PC 201 receives an operation of selecting a function desired by the user to install from the functions displayed in the function information display area 108, the PC 201 transmits information indicating the function to the server (step S703). Then, the server that receives the information indicating the selected function performs program transmission processing to transmit a program to install the selected function to the PC 201 (not shown). In step S704, when the installation program read from the server and transmitted to the PC 201 is obtained, the PC 201 activates the installation program so that the new function is added on to the application.

If, for example, the user selects the underwater correction of reference number 109, the CPU 202 transmits the ID corresponding to the selected function to the server 208. The server 208 searches for the function corresponding to the received ID and transmits an installer to add on the program of the function to the image processing application to the PC 201. The PC 201 executes the received installer to add on the function to the image processing application. The PC 201 may also be configured so that similar processing can be performed when functions that can be updated among functions installed are displayed.

The basic configuration of the present embodiment is that the user searches for a function candidate which can be selected as an add-on. If this point is taken into consideration, the present embodiment can be modified, for example, as described below. In the first embodiment, the installed functions are prevented from being displayed in the display of information about add-on functions in FIG. 1B and thus, when the image information of the selected image is transmitted to the server, information about installed functions are also transmitted to the server together. Accordingly, the installed functions installed are removed from a search result when the server 208 searches for functions in step S502. However, as a method of preventing the installed functions from being displayed, the installed functions may be removed from display target functions when the PC 201 displays functions in step S702. Thus, as a first modification of the first embodiment, the PC 201 that receives the search result of add-on functions from the server removes the installed functions from display target functions without transmitting information about the installed functions to the server. That is, when displaying function information in step S702, the PC 201 removes the installed functions from display target functions.

First step S302 in FIG. 3 is executed, but the information transmitted to the server in step S303 is image information. Correspondingly, the information received by the server 208 in step S501 is also image information. Then, in step S502, add-on functions are searched for by using the received image information. That is, if the image information shown in FIG. 4A is received, all functions shown in the function information 607 to 610 in FIG. 6 become the search result. In the above description, the function 610 installed in the PC is removed from the search result, but at this point, whether the function 610 is installed in the PC is not known according to the present procedure and thus, all functions related to the received image information become the search result. Then, the server 208 transmits the function information as the search result to the PC 201. The PC 201 receives the function information transmitted by the server. Then, before step S702, the PC 201 removes functions already installed in the PC from the function information received from the server on the basis of information about the functions obtained and installed in the PC. By limiting the function information displayed in step S702 in this manner, the image processing application can be prevented from displaying information about functions already installed in the PC. The above is another method of preventing the image processing application from displaying information about functions already installed in the PC. Instead of performing the processing in step S302, the processing may be performed between steps S701 and S702. The present modification may also be applied to other modifications described below. Incidentally, according to the present modification, no function information is transmitted to the server and thus, the latest version information of functions installed cannot be obtained when a function is added on.

Next, a second modification of the first embodiment will be described. The present modification is configured to be able to extend the image selected by the image processing application to a plurality of images so that the add-on function according to the first embodiment can be executed on the plurality of selected images. The present modification is the same as the first modification in the configuration in which image information of selected images and function information of functions installed are transmitted from the PC 201 to the server 208.

Figure 9A:
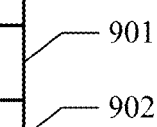
Figure 9B:
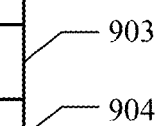

FIG. 8 shows the display screen of an image processing application when a plurality of images are selected and the add-on function is executed. In FIG. 8, the user selects images 801, 802 in the thumbnail display area. A plurality of images can be selected by an operation of the operation unit 206, for example, a drag operation by the mouse or a keyboard operation. If the add-on function is executed in this state, the image information of the selected two images is transmitted to the server 208 together with function information (for example, FIG. 4B). That is, the PC 201 performs processing on each selected image according to the flowchart in FIG. 3. If, for example, the image information of the selected two images in FIG. 8 is FIGS. 9A and 9B, image information 901 to 904, thumbnail images of the images 801, 802, and the function information obtained in step S302 are transmitted to the server 208. The server 208 first searches for and decides add-on functions to be transmitted to the PC 201 from the function information management table shown in FIG. 9C, by using the received image information and function information according to the flowchart in FIG. 5. In the present embodiment, if the image information of a plurality of images is transmitted to the server 208, the server 208 first sets functions related to the received image information as a search result. That is, if the image information shown in FIGS. 9A and 9B is transmitted, the server 208 sets functions 905 to 907 in the function information management table as a search result by referring to the function information received from the PC 201. The function of reference numeral 905 is related to image information that the image format is JPG, the function of reference numeral 906 is related to image information that the photographing mode is a night scene, and the function of reference numeral 907 is related to image information that the photographing mode is sports.

Next, the server 208 searches for functions that can be applied to all the selected images from among functions of the above search result. That is, if the image information shown in FIGS. 9A and 9B is transmitted, the image information that the image format is JPG is common and thus, the function of reference numeral 905 can be applied to the two images. Then, a flag is attached to the function 905. The flag is used to distinguish, among searched functions, functions that can be applied to all selected images from functions that can be applied to one of images. Thus, the flag may be attached to the functions 906, 907 or any method other than the flag may be applied. Therefore, according to the present modification, useful processing for add-on function is added in consideration of the fact that a plurality of images is selected in the present modification.

Next, when image processing in step S503 is performed, the image processing is performed on all images to which functions of the search result can be applied. That is, the brightness correction, trimming, contrast adjustment, and tilt correction included in the function 905 which is common to thumbnails of the images 801, 802 are made. The night scene correction of the function 906 is made on the thumbnail of the image 801 and the vibration correction of the function 907 is made on the thumbnail of the image 802. When transmitting function information in step S504, the server 208 transmits the function information 905 to 907 and also the flag attached above. When transmitting processed image data, all the processed image data described above is transmitted. When the function information is received, the image processing application displays the functions that can be applied to at least one of the selected images and processed image data. In FIG. 8, a night scene correction function 803 that can be applied to the image 801 and a processed image 804 thereof are displayed and also, a vibration correction function 805 that can be applied to the image 802 and a processed image 806 thereof are displayed. Also a brightness correction function that can be applied to the both the images 801, 802 and processed images 808, 809 thereof are displayed. The display mode of functions that can be applied to at least one of the selected images and the display mode of functions that can be applied to all selected images can be switched by radio buttons 810, 811. Functions that can be applied to at least one of selected images are displayed as default and thus, the radio button 810 that shows an ORed search result is selected. If the radio button 811 that shows an ANDed search result is selected, only functions that can be applied to all selected images are displayed. To display functions that can be applied to all selected images, the image processing application refers to the flag transmitted from the server. If the flag is attached to the functions that can be applied to all selected images when the server searches for add-on functions, the function information to which the flag is attached is displayed when the radio button 811 is selected. That is, the function Information denoted with reference numeral 905 in FIG. 9C is displayed. Thus, by referring to the flag attached by the server, the display of the function that can be applied to all selected images and the display of the function that can be applied to at least one of selected images can be switched.

Although the present modification assumes the configuration of the first embodiment, no change is required to attachment of the flag even if the present modification assumes the configuration of the first modification. In this case, the above-described display control may be implemented on a result obtained by removing information about installed functions from the search result received from the server 208 by the PC 201. If, as a result of removing installed functions on the side of the PC 201, there remains no add-on function information common to selected images, only display control is implemented accordingly.

As a third modification, a modification of the first embodiment suitable when the number of selected images is large such as 100 images will be described. If, for example, the number of selected images is 100 and image information common to 99 images thereof is present, but the image information is not present in the remaining one image, the function common to the 99 images is not displayed even if the radio button 811 (AND) in FIG. 8 is selected. If the radio button 810 is selected, the function common to the 99 images is displayed, but many other pieces of function information are expected to be displayed and it is troublesome for the user to find the function related to the image information common to the 99 images. Such a situation is considered to occur when, for example, 99 images are actually taken in the photographing mode to the night scene and one image is taken in the photographing mode to the sports mode even if the user thinks that all 100 images have been taken in the photographing mode to the night scene. Thus, in a case where the add-on function is executed by selecting many images, the server 208 searches for and decides functions related to image information showing a ratio of a predetermined threshold or more among a plurality of selected images.

The present modification will be described below with reference to FIG. 10. Also in the present modification, the configuration in which the image information of selected images and the function information of installed functions are transmitted from the PC 201 to the server 208 is the same as in the first embodiment. That is, the following description assumes a case when a plurality of images is selected in the configuration in which the function information is transmitted from the PC 201 to the server 208 according to the first embodiment.

Figure 10:
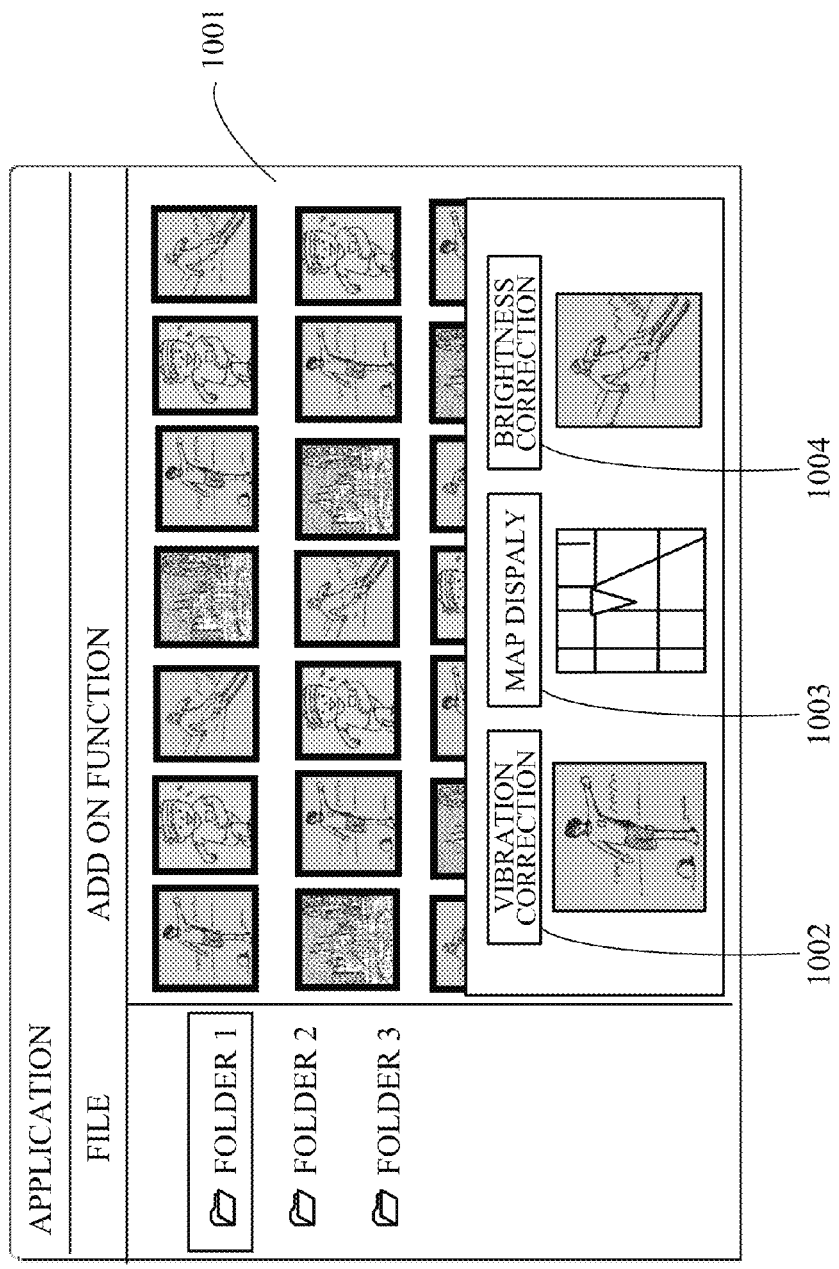
FIG. 10 is a diagram showing a function information display screen of the image processing application when many images are selected in an embodiment of the present invention.

FIG. 10 shows the display screen of an image processing application when the add-on function is executed under a condition that 100 images displayed in a thumbnail display area 1001 are selected. The ratio of image information held by a plurality of images selected in the thumbnail display area 1001 is shown in FIG. 11A. According to FIG. 11A, image information 1101 shows that the image format of 85 images of selected 100 images is JPG, 15 images are moving images, and five images are RAW data. Image information 1102 shows that the photographing mode of 10 images is the night scene, the photographing mode of 90 images is the sports, and there is no image whose photographing mode is underwater. Image information 1103 shows that 60 images have GPS information attached thereto and 40 images have no attached GPS information. If the user executes the add-on function by selecting 100 images, the PC 201 transmits the image information shown in FIG. 11A to the server 208. Criteria of determining whether information in FIG. 11A can be generated can be achieved by enabling the user to set, for example, the number of selected images to the image processing application. Alternatively, the server administrator may set the criteria to the image processing application depending on server side conditions.

The server 208 searches for and decides the functions related to the image information having the ratio of a predetermined threshold or more to the received 100 images. It is assumed here, for example, that the server administrator sets the threshold to 50%. In this case, among selected images, images whose ratio of image information exceeds 50% include image information 1104 to 1106 in FIG. 11A. Thus, the server 208 searches for the functions related to the image information 1104 to 1106 by using the function information management table shown in FIG. 11B. In FIG. 11B, the function information 1106 to 1108 become the search result. The reason why the automatic adjustment function is not included in the search result is the same as in the first embodiment. The server 208 transmits the function information 1106 to 1108 as the search result to the PC 201. The image processing application displays the received function information according to the display priority. In FIG. 10, a vibration correction function 1002, a map display function 1003, and a brightness correction function 1004 are shown in descending order of display priority from the left side of the screen. The threshold set by the server 208 can freely be set by the server administrator. Thus, by searching for a function related to image information which has the ratio more than a predetermined value to the selected images, the functions can be searched for efficiently when the add-on function is executed by selecting many images.

Also in the present modification, as shown in FIG. 10, processed thumbnail images are displayed together with the add-on function names. Thus, for example, it is necessary for the server 208 to distinguish images having image information included in the ratio of the received image information from the received image information. Then, all thumbnail images corresponding to the searched add-on functions are processed and transmitted to the PC 201 together with the add-on functions. This processing is basically the same as in the first embodiment. Because the number of selected images is large, add-on functions can be displayed by providing a scroll bar (horizontal direction) concerning the display priority and a scroll bar (vertical direction) concerning processed images.

According to the present modification, although functions related to the image information showing the ratio more than a predetermined value are searched for when the add-on function is executed by selecting many images, only a predetermined number of functions may be searched for in descending order of ratio of image information. For example, consider to search for seven functions in descending order of ratio of image information received by the server 208. The value of "7" is assumed to be freely settable by the server administrator. If a search of the image information shown in FIG. 11A is performed in descending order of ratio to the selected images, image information 1105 having the ratio of 90% and whose photographing mode is sports is first searched for. If a function related to this image information is searched for by using the function information management table shown in FIG. 11B, the vibration correction function shown in reference numeral 1107 is detected. If the search is performed in this manner until seven functions are found in descending order of ratio of image information to the selected images, the functions of reference numerals 1106 to 1109 become the search result. Also in this case, functions installed in the PC 201 are removed from the search result. If a plurality of functions is related to the same image information and a predetermined threshold is exceeded when all such functions are included in the search result, it is assumed that functions with higher display priorities take precedence. The server 208 transmits the function information of the search result to the PC 201 and the image processing application displays the received function information. That is, if the ratio of image information of the selected images is as shown in FIG. 11A, the function information of reference numerals 1106 to 1109 as a search result by the server is displayed in the image processing application. Thus, if the server administrator sets a predetermined threshold to the number of functions of the search result, the user can efficiently search for functions even when image information of many images is transmitted to the server.

Second Embodiment

In the first embodiment and the modifications thereof, if the add-on function is executed under a condition that an image is selected, the server searches for the functions related to the image information of the selected image and presents such functions to the user. In the present embodiment, if the editing function of the menu is selected under a condition that an image is selected, functions that can be applied to the selected image among functions installed in the PC and add-on function processing can be selected and executed.

First, the function selection in the editing menu will be described with reference to FIG. 12A. The basic screen configuration is the same as in FIG. 1A, but the menu of the image processing application in the present embodiment includes editing 1202. If the user selects an image displayed in the thumbnail display area, the editing menu 1202 can be selected and executed. While the editing menu 1202 is used to execute functions to edit an image, the context menu or a dedicated button may be also used. FIG. 12A shows the display screen of the image processing application when an image 1201 displayed in the thumbnail display area and the editing menu 1202 is selected. If the editing menu 1202 is selected, the image processing application displays, among the functions installed in the PC, a function 1203 that can be applied to the selected image. This display can be made by obtaining, like in the first embodiment, information about the functions installed in the PC 201 by the CPU 202 as functions of the image processing application. FIG. 12A shows that functions of the automatic adjustment and underwater correction are already installed in the PC. If, for example, the function of the automatic adjustment is selected, the automatic adjustment of the selected image 1201 is made. Even if other function is installed in the PC, this function is not displayed in the function 1203 unless it is applied to the selected image 1201. An add-on of function 1204 is displayed downwardly from the function 1203. If the add-on of the function 1204 is selected, the server 208 searches for functions related to the image information of the selected image and displays the function information in the image processing application. This portion of the processing is the same as the processing of the above embodiment.

Figure 12B:
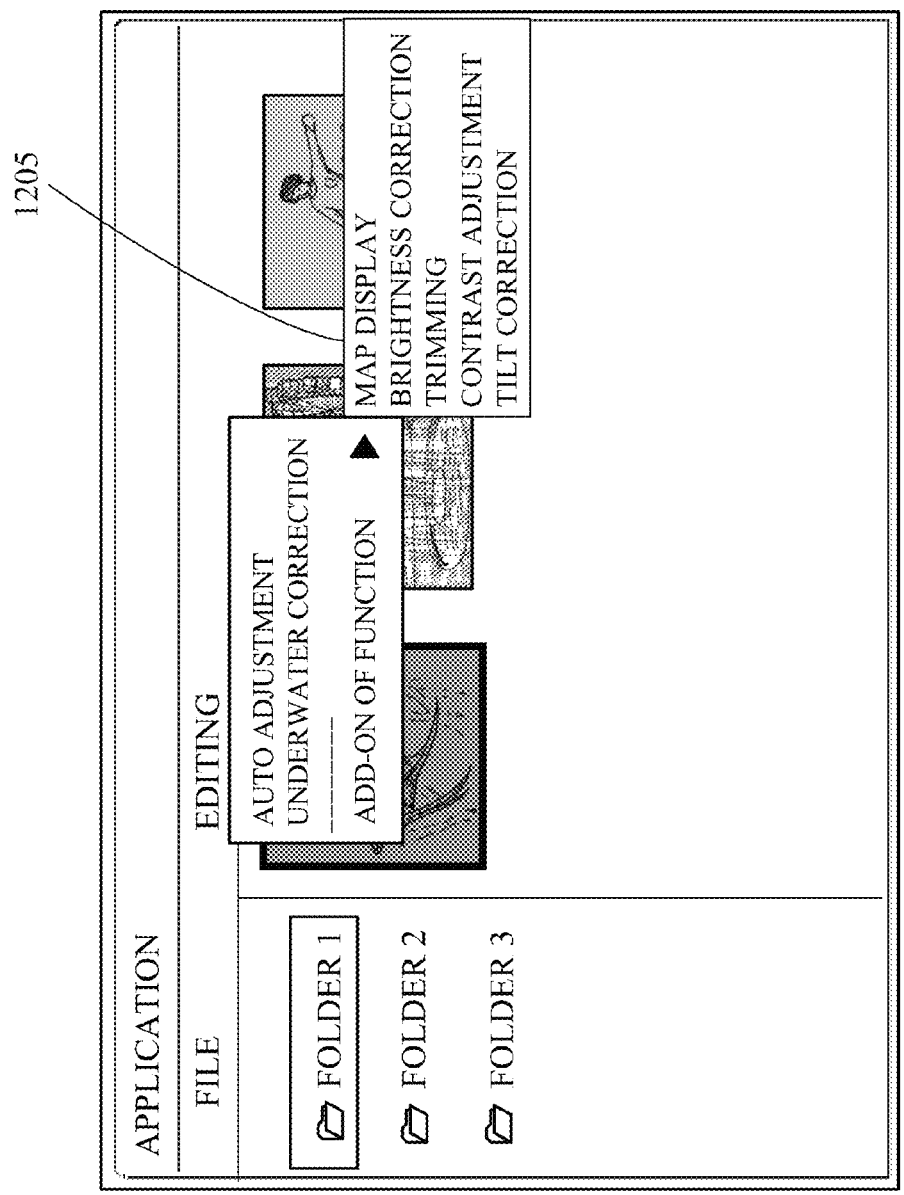

That is, in FIG. 12A, if the add-on of function 1204 is selected, the PC communicates with the server 208 and receives the function information as the search result by the server and displays, as shown in FIG. 12B, the received function information 1205. Consider, for example, a case when the image information of the selected image 1201 is FIG. 4B. It is also assumed that the functions of the automatic adjustment and underwater correction are already installed in the PC. If, in this case, the image information of the selected image 1201 and information about the functions installed in the PC are transmitted, the server 208 uses the function information management table shown in FIG. 6 to set the functions of reference numerals 607, 609 as the search result. Functions of reference numerals 608, 610 are already installed in the PC and so are removed from the search result. Then, the server 208 transmits the function information of the search result to the PC 201 and the image processing application displays the received function information. The received function information 1205 is displayed, for example, to the right of the add-on of function 1204. If no function that can be executed on the selected image is installed in the PC, for example, only the add-on of function 1204 is displayed. Thus, if the editing menu is selected, among the functions installed in the PC, the function that can be applied to the selected image are displayed and thus, the user can select only editing functions that can be applied to the selected image. If the user desires an add-on function that is not yet installed, that function can be added on by the same operation. Even if no function that can be executed on the selected image is installed, add-on of a function can be executed by the same operation.

If a plurality of images is selected in FIG. 12A, image information to be transmitted to the server 208 may be generated, and search processing by the server 208 may be performed in the similar manner of the second or third modification of the first embodiment. In that case, the display configuration of add-on functions, similar to the second or third modification can be achieved in the display 1205 of FIG. 12B. For example, the display corresponding to the OR button or the AND button in FIG. 8 and the display on the basis of the ratio of image information in FIG. 10 are possible similarly to in the second or third modification. Incidentally, whether an add-on function is common to selected images can be identified by attaching a mark or the like to the displayed function name.

In the present embodiment, since no thumbnail image processed by the server 208 accompanying the search for add-on functions is displayed and thus, the image processing application causes no problem if the image processing application is configured to transmit no thumbnail image from the PC 201 to the server 208 together with image information of the selected image. Similarly, for example, like the first embodiment, the configuration in which thumbnail images are transmitted to the server and processed images thereof are received may be adopted.

Third Embodiment

In the second embodiment, the server 208 searches for add-on functions, but in the present embodiment, the PC 201 is configured to search for add-on functions. That is, in the present embodiment, an image processing application is configured to hold a function information management table inside the PC 201 as a database accompanying the image processing application installed in the PC 201. In this manner, the search function of add-on functions can be executed by the PC 201. Accordingly, when add-on functions are searched for, the add-on functions that can be applied to the selected image can be presented without communicating with the server 208.

The function information management table according to the present embodiment is assumed to be provided from the server 208 accompanying the image processing application in advance before the add-on of function menu is selected and stored in the secondary storage device 204. The function information management table is configured to be updatable to the latest management table by a function of the application or an instruction from the server 208 when necessary. If the configuration of the function information management table is the same as that in the first or second embodiment, the search processing performed by the server 208 can be performed by the image processing application without modification thereof. That is, the image processing application searches the function information management table by using the image information of the selected image and the information about the function already installed. The display of the function display 1205 in FIG. 12B can also be controlled according to the display priority. Further, the search processing of the add-on function when a plurality of images is selected can be implemented by, as described in the second the embodiment, performing the processing described in a modification of the first embodiment by the image processing application without modification of the processing. However, the "predetermined threshold" used in a modification of the first embodiment is assumed to be provided to the PC 201 from the server 208 in advance together with the function information management table.

If, in addition to the above, version information of each function is added to the function information management table, the version of each function installed in the PC 201 can be determined, and whether to update each function can be presented to the user. If the version of the installed function is not the latest version, that the function can be updated can be indicated by attaching a mark or the like to the applicable function name in the display 1203 of FIG. 12A.

Figure 13:
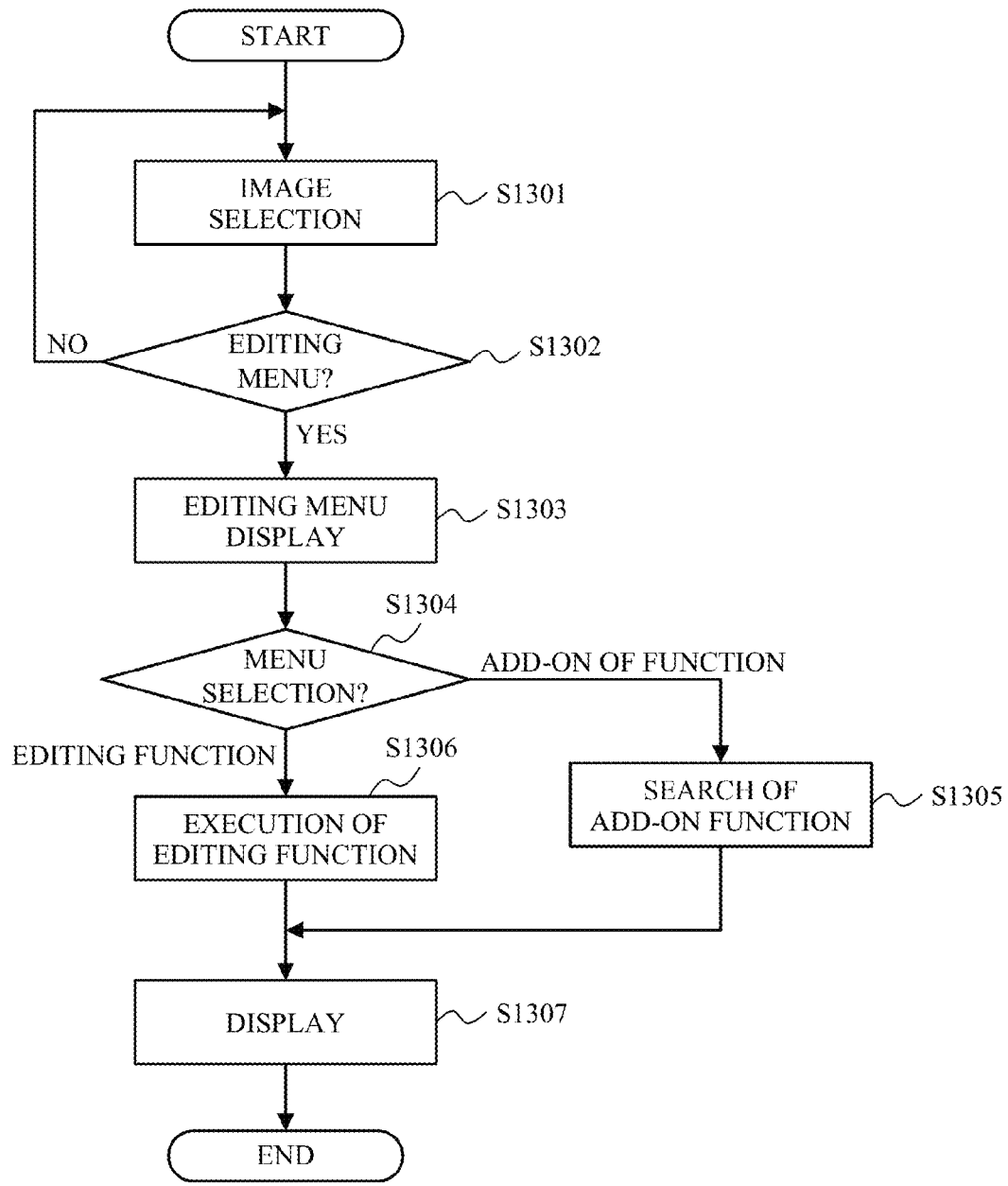
FIG. 13 is a diagram showing a flowchart to execute the editing function by the image processing application according to an embodiment of the present invention.

The flow of processing in the present embodiment will be described with reference to the flowchart in FIG. 13.

In step S1301, an image displayed in the screen of FIG. 12A is selected. It is assumed that when the screen in FIG. 12A is displayed, the function information management table is already obtained inside the PC 201 as a database accompanying the image processing application. Next, in step S1302, whether the editing menu is selected is determined. If the editing menu is determined not to be selected, the determination is repeated. If the editing menu is determined to be selected, in step S1303, the editing menu is displayed, that is, the screen in FIG. 12A is displayed. The display can be made by, similarly to the second embodiment, obtaining the information about the function installed in the PC 201 as functions of the image processing application by the CPU 202. Next, in step S1304, the selection of the display menu is determined. If the selection of the add-on function is determined, in step S1305, the add-on function is searched for. The search processing is the similar to the second embodiment except that the processing is performed in the PC 201. If, in step S1304, the selection of the editing function is determined, the selected editing function is executed on the selected image. In step S1307, the result of the search for the add-on function in step S1305 or the execution of the editing function in step S1306 is displayed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-189401, filed on Aug. 31, 2011, which is hereby incorporated by reference herein its entirety.

What is claimed is:

1. An information processing apparatus in which an application program having an image processing function operates, comprising:
   a processor; and
   a memory having stored thereon instructions that when executed by the processor, cause the processor to:
   select an image to be processed by the application program;
   display, on a display unit, a table showing a plurality of functions of a processing which is applicable to the image selected, according to a feature of the image selected, wherein the plurality of functions of the processing shown in the table include a function of a processing which the application program already has, and a function of a processing which to be added to the application program;
   select, from the functions shown in the table displayed on the display unit, a function to be applied to the image selected;
   obtain an installation program corresponding to the function of the processing selected, when the function of the processing selected is the function of the processing to be added to the application program; and
   add the function of the processing by using the installation program.

2. The information processing apparatus according to claim 1, further comprising
   a communication unit that communicates with an external server,
   wherein the function to be added to the application program is selected from among function candidates decided by the external server, on the basis of the feature of the subject image to be processed.

3. The information processing apparatus according to claim 2, wherein the installation program is obtained from the external server via the communication unit.

4. The information processing apparatus according to claim 1, wherein
   the memory stores information indicating a correspondence between the feature of an image and the function to be added,
   wherein the function corresponding to the feature of the subject image to be processed is selected, by using the information stored in the memory.

5. The information processing apparatus according to claim 4, further comprising a communication unit that communicates with an external server,
   wherein the installation program is obtained from the external server via the communication unit.

6. The information processing apparatus according to claim 4, further comprising a reading unit that reads the installation program from an external storage medium.

7. The information processing apparatus according to claim 1, wherein,
   when the function of the processing selected is the function of the processing which the application program already has, the installation program is not obtained, and the application program is used to execute the function of the processing selected.

8. A control method of an information processing apparatus in which an application program having an image processing function operates, comprising:
   selecting an image to be processed by the application program;
   displaying, on a display unit, a table showing a plurality of functions of a processing which is applicable to the image selected, according to a feature of the image selected in the selecting the image, wherein the plurality of functions of the processing shown in the table include a function of a processing which the application program already has, and a function of a processing which to be added to the application program;
   selecting, from the functions shown in the table displayed on the display unit, a function to be applied to the image selected;
   obtaining an installation program corresponding to the function of the processing selected in the selecting the function, when the function of the processing selected by the function selecting means is the function of the processing to be added to the application program; and
   adding the function of the processing by using the installation program obtained in the obtaining the installation program.

9. A non-transitory computer readable recording medium recording a program that causes a computer in which an application program having an image processing function operates, to execute a control method, the control method, comprising:

selecting an image to be processed by the application program;

displaying, on a display unit, a table showing a plurality of functions of a processing which is applicable to the image selected, according to a feature of the image selected in the selecting the image, wherein the plurality of functions of the processing shown in the table include a function of a processing which the application program already has, and a function of a processing which to be added to the application program;

selecting, from the functions shown in the table displayed on the display unit, a function to be applied to the image selected;

obtaining an installation program corresponding to the function of the processing selected in the selecting the function, when the function of the processing selected by the function selecting means is the function of the processing to be added to the application program; and adding the function of the processing by using the installation program obtained in the obtaining the installation program.

* * * * *